US009720914B2

(12) United States Patent
Agrawal et al.

(10) Patent No.: US 9,720,914 B2
(45) Date of Patent: Aug. 1, 2017

(54) NAVIGATIONAL AID FOR ELECTRONIC BOOKS AND DOCUMENTS

(71) Applicant: MICROSOFT CORPORATION, Redmond, WA (US)

(72) Inventors: Rakesh Agrawal, San Jose, CA (US); Krishnaram Kenthapadi, Sunnyvale, CA (US); Anitha Kannan, Saratoga, CA (US); Sreenivas Gollapudi, Cupertino, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 277 days.

(21) Appl. No.: 14/523,404

(22) Filed: Oct. 24, 2014

(65) Prior Publication Data
US 2016/0117406 A1    Apr. 28, 2016

(51) Int. Cl.
*G06F 17/30*     (2006.01)
(52) U.S. Cl.
CPC .. *G06F 17/30014* (2013.01); *G06F 17/30687* (2013.01)
(58) Field of Classification Search
CPC ......... G06F 17/30873; G06F 17/30014; G06F 17/30595; G06F 17/30687
USPC ................................................ 707/749, 747
See application file for complete search history.

(56) References Cited

U.S. PATENT DOCUMENTS

| | | | |
|---|---|---|---|
| 5,708,825 A | 1/1998 | Sotomayor | |
| 7,395,501 B2 | 7/2008 | Graham et al. | |
| 7,861,149 B2 | 12/2010 | Wang et al. | |
| 2002/0091529 A1* | 7/2002 | Whitham | 704/275 |
| 2002/0111968 A1* | 8/2002 | Ching | 707/514 |
| 2009/0083677 A1* | 3/2009 | Darwish et al. | 715/854 |
| 2011/0219290 A1 | 9/2011 | Leshner et al. | |
| 2011/0261030 A1 | 10/2011 | Bullock | |
| 2012/0078612 A1 | 3/2012 | Kandekar et al. | |

OTHER PUBLICATIONS

Georgiev et al., Feature-Rich Part-of-Speech Tagging for morphologically complex language: Application to Bulgarian, Apr. 2012, ACM, 492-502.*
Butarbutar, et al., "Indexing Text Documents Based on Topic Identification", In Proceedings of 11th International Conference on String Processing and Information Retrieval, Oct. 5, 2004, 12 pages.
"CK-12 Foundation", Retrieved on: Aug. 29, 2014, Available at: http://www.ck12.org/, all page.

(Continued)

*Primary Examiner* — Jean B Fleurantin
(74) *Attorney, Agent, or Firm* — Shook Hardy & Bacon, LLP

(57) ABSTRACT

Systems, methods, and computer storage media are provided for generating rich navigational study aids for electronic books. For a particular section of interest in a document, one or more related sections for providing additional context to the particular section are determined. The related sections are ranked based on a score indicating significance to the particular section. Based on a user's information processing preference, a set of ranked navigational links to each related section is presented to the user for additional context related to the particular section.

19 Claims, 7 Drawing Sheets

(56) References Cited

OTHER PUBLICATIONS

"Requester Best Practices Guide", Published on: Jun. 2011, Available at: http://mturkpublic.s3.amazonaws.com/docs/MTURK_BP.pdf, all pages.
"Education Technology Task Force Recommendations", Published on: Aug. 16, 2012, Available at: http://www.cde.ca.gov/eo/in/documents/efftmemo.pdf, all pages.
Agrawal, et al., "Data mining for improving textbooks", In ACM SIGKDD Explorations Newsletter, vol. 13, Issue 2, Dec. 2011, 13 pages.
Anderson, John R, "Acquisition of cognitive skill", In Proceeding of Psychological Review, vol. 89, Jul. 1982, 38 pages.
Bakewell, K. G. B., "Research in indexing: More needed?", In Proceeding of the Indexer vol. 18, Apr. 1993, 5 pages.
Bareiss, et al., "Applying AI Models to the Design of Exploratory Hypermedia Systems", In Proceedings of the Fifth ACM Conference on Hypertext, Dec. 1, 1993, 12 pages.
Birkerts, Sven, "The Gutenberg Elegies: The Fate of Reading in an Electronic Age", In Book Faber & Faber, First Edition, Nov. 14, 2006, 5 pages.
Brusilovsky, Peter, "Adaptive hypermedia", In User Modeling and User-Adapted Interaction, Retrieved on: Aug. 29, 2014, 24 pages.
Brusilovsky, et al., "Web-Based Education for all: A tool for development adaptive courseware", In Computer Networks and ISDN Systems, vol. 30, Issue 1-7, Apr. 1998, 15 pages.
Brusilovsky, et al., "ELM-ART: An intelligent tutoring system on World Wide Web", In Proceeding of Intelligent Tutoring Systems, Jun. 12, 1996, 8 pages.
Chi, et al., "ScentHighlights: Highlighting conceptually-related sentences during reading", In Proceedings of the 10th International Conference on Intelligent User Interfaces, Jan. 10, 2005, 3 pages.
Chi, et al., "ScentIndex: Conceptually reorganizing subject indexes for reading", IEEE Symposium on Visual Analytics Science and Technology, Oct. 31, 2006, 8 pages.
Cleary, et al., "Practical methods for automatically generating typed links", In Proceedings of the the seventh ACM conference on Hypertext, Jan. 1999, 11 pages.
Fellbaum, Christiane, "WordNet: An electronic lexical database", In Proceeding of MIT Press, Retrieved on: Aug. 29, 2014, 7 pages.
Fidel, Raya, "User-centered indexing", In Journal of the American Society for Information Science, Sep. 1994, 5 pages.
Fortunato, et, "Approximating pagerank from in-degree", In Algorithms and Models for the Web-Graph, Nov. 30, 2006, 13 pages.
Henze, et al., "Adaptation in open corpus hypermedia", In International Journal of Artificial Intelligence in Education, Retrieved on: Aug. 29, 2014, 27 pages.
Jeh, et al., "Scaling personalized web search", In Proceedings of the 12th international conference on World Wide Web, May 20, 2003, 35 pages.
Jurafsky, et al., "Speech and language processing", In Book published by Prentice Hall, 2nd edition, May 16, 2008, 5 pages.
Justeson, et al., "Technical terminology: Some linguistic properties and an algorithm for indentification in text", In Natural Language Engineering, Jan. 1995, 1 page.
Kelly, Declan, "Adaptive Versus Learner Control in a Multiple Intelligence Learning Environment", In Journal of Educational Multimedia and Hypermedia, Jul. 2008, 4 pages.
Meeker, et al., "Internet trends", In Technical report, KPCB, Dec. 3, 2012, 88 pages.
Motwani, et al., "Randomized Algorithms", In Algorithms and theory of computation handbook, Feb. 1, 2010, 24 pages.
Mulvany, Nancy C., "Indexing Books", Published on: Nov. 1, 2005, Available at: http://www.amazon.com/gp/search?search-alias=stripbooks&field-isbn=978-0226552767, all pages.
Ong, Walter J., "Orality & Literacy: The Technologizing of the Word", Retrieved on: Aug. 29, 2014, Available at: http://occupytampa.org/files/wcom/ong%20walter%20orality%20and%20literacy.pdf, all pages.
Papanikolaou, et al., "Personalizing the interaction in a web-based educational hypermedia system: The case of Inspire", In Journal User Modeling and User-Adapted Interaction, vol. 13, Issue 3, Aug. 2003, 66 pages.
Remde, et al., "SuperBook: An automatic tool for information exploration- Hypertext?", In ACM Conference on Hypertext, Nov. 1987, 14 pages.
Saari, Donald G., "Decisions and elections: Explaining the unexpected", Published on: Oct. 22, 2001, Available at: http://www.amazon.com/Decisions-Elections-Explaining-Donald-Saari/dp/0521004047, all pages.
Salton, et al., "Automatic Analysis, Theme Generation, and Summarization of Machine-Readable Texts", In Book of Readings in information visualization, Jun. 1994, 6 pages.
Thayer, et al., "The Imposition and Superimposition of Digital Reading Technology: The Academic Potential of E-Readers", In Proceedings of the SIGCHI Conference on Human Factors in Computing Systems, May 7, 2011, 10 pages.
Toutanova, et al., "Feature-Rich Part-of-Speech Tagging with a Cyclic Dependency Network", In Proceedings of the Conference of the North American Chapter of the Association for Computational Linguistics on Human Language Technology—vol. 1, May 27, 2003, 8 pages.
Triantafillou, et al., "The Value of Adaptivity based on Cognitive Style: An Empirical Study", In British Journal of Educational Technology, vol. 35, Issue 1, Jan. 14, 2004, 2 pages.
Wang, et al., "An overview of Microsoft Web N-gram corpus and applications", In Proceedings of the NAACL HLT, Jun. 2, 2010, 4 pages.
Weber, et al., "User modeling and adaptive navigation support in WWW-based tutoring systems", In Proceedings of the Sixth International Conference, Jun. 2, 1997, 12 pages.

* cited by examiner

NAVIGATIONAL AID FOR ELECTRONIC BOOKS AND DOCUMENTS

BACKGROUND OF THE INVENTION

The increased popularity of electronic books has opened the door to a variety tools and techniques to facilitate effective use of the technology. Innovations related to electronic books have assisted users in areas such as portability, accessibility, and navigability. However, functionalities directed to improving learning experiences have been somewhat limited. In harnessing the processing power of modern computing, electronic books may be presented in a structured fashion for accommodating the information processing preference of students.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer storage media are provided for generating rich navigational study aids for electronic books. In embodiments, for a particular section of interest in the digital content, one or more related sections for providing additional context to the particular section are determined. The related sections are ranked based on a score indicating significance to the particular section. A set of ranked navigational links to the related sections are presented to the user, based on the user's information processing preference.

BRIEF DESCRIPTION OF THE DRAWING

The present invention is illustrated by way of example and not limitation in the accompanying figures in which like reference numerals indicate similar elements and in which.

DETAILED DESCRIPTION OF THE INVENTION

Figure 1:
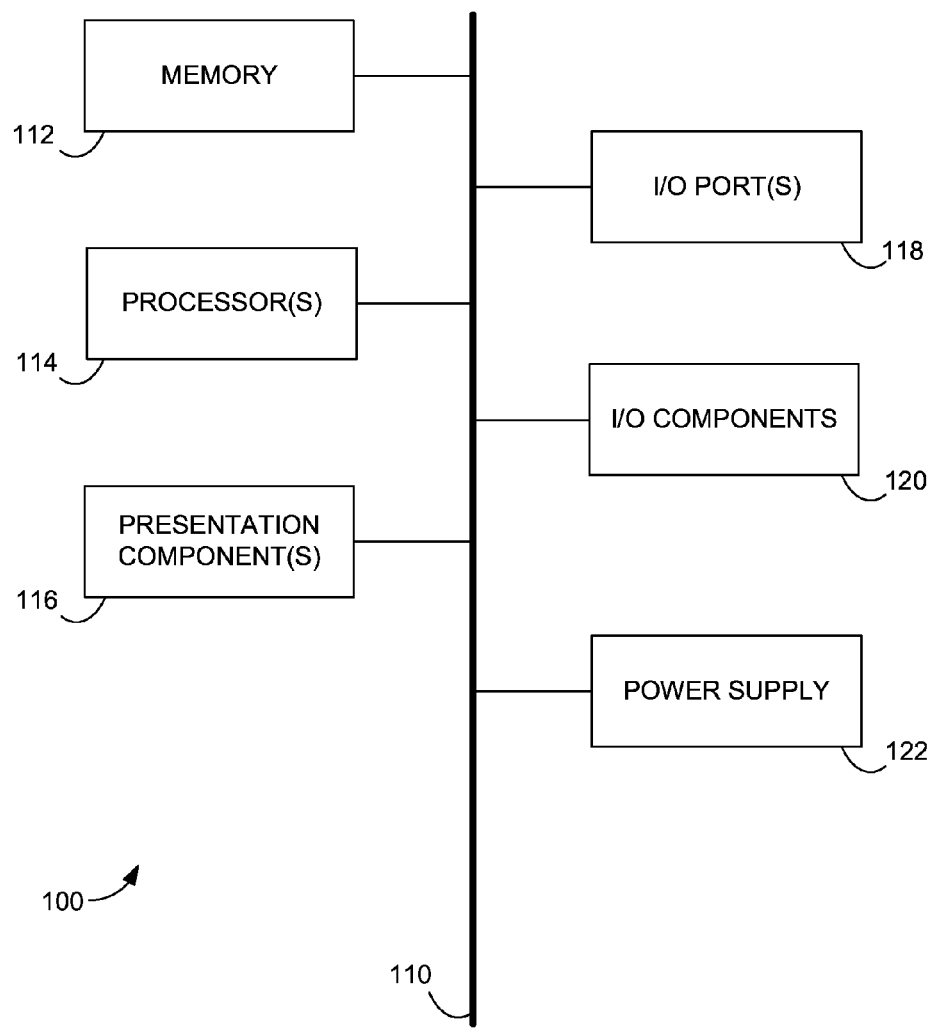
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Electronic books and other digital content may provide traditional navigational guides (e.g., a table of contents or index) for providing a user with a means for navigating the text to find sections of particular interest. Oftentimes, however, such navigational guides are not particularly geared to the user's optimal learning preferences. For example, a user (e.g., a student) may be particularly interested in learning about, for example, atomic theory. Relying on a standard table of contents or index does nothing to guide the user to particularly relevant sections for understanding atomic theory based on the user's information processing preferences. Although the natural progression for books and digital content is typically sequential, the user's information processing preferences may be categorized more as curious, diligent, or a combination of both, as will be described in further detail herein. When reading a section, a curious user might be open to referring to unread later sections that provide advanced information, while a diligent student might prefer references only to earlier sections to refresh the material the user has already read or skipped over. The user interested in atomic theory may want a refresher on the fundamental principles of atomic theory, and as such, may wish to digress to previous sections in the book discussing, for example, "what is an atom" and/or "what is atomic mass." Although traditional navigational guides may be useful for the user who knows exactly what she is looking for, creating and traversing such guides is generally time consuming and do not provide the user with any indication of significance to the particular section of interest.

Embodiments of the present invention are directed to providing an algorithmically-generated navigational aid for enhancing the experience of reading from electronic books (hereinafter also referred to as "documents"). A document, as used herein, refers to a long text in electronic document form. The document generally includes books, references, manuals, etc. The navigational aid (herein also referred to as "content navigator manager") generates, for a particular section of a document, concept references that are helpful for the reader's further understanding of the particular section. Concept phrases, as used herein, include principles or keywords related to particular principles that are discussed in the document. For example, referring briefly to FIG. 3, a group of concept phrases from various principles related to "electricity" and the direct relationships there between are illustrated. Concept references, as used herein, comprise a concept phrase and a location for the same concept phrase explained in another section or specific locations within another section (herein also referred to as a "related section") in the document, which may also be accompanied by a navigational link (e.g., a hyperlink or URL) to the related section. In embodiments, concept references can be represented as a data structure comprising a concept and a section (i.e., <concept, section> pairs). The concept references are utilized as pointers to specific concepts along with the section in which the concept occurs.

Various aspects of the technology described herein are generally directed to systems, methods, and computer-readable storage media for the generation of rich navigational study aids for electronic books. In essence, embodiments of the present invention are directed to algorithmically determining related sections of a long electronic document and ranking the sections based on significance, for ultimately providing a user with a rich navigational aid attuned to the user's particular information processing preference. The significance of relationships between sections is algorithmically determined by computing significance scores of concept phrases in a related section for understanding a particular section, as will be described in more detail herein. As such, a rich navigational aid is provided for navigating a document in a format tuned particularly for a user's learning preferences.

Accordingly, one embodiment of the present invention is directed to one or more computer storage media storing computer-usable instructions that, when used by one or more computing devices, cause the one or more computing devices to perform operations for automatically generating rich navigational study aids for electronic books. One or more related sections in a digital content are determined, for a particular section of the digital content, wherein each related section provides additional context to the particular section. The one or more related sections are ranked based on a significance score of each related section to the particular section. An ordered set of navigational links to at least some of the one or more related sections are presented, the set of links being adapted to align with an information processing preference of a user.

Another embodiment of the present invention is directed to a computer-implemented method for automatically generating rich navigational study aids for electronic books. An input indicative of an information processing preference of a user is received. Based on the information processing preference of the user, one or more related sections in the digital content are determined for the particular section of a digital content. Each related section provides additional context to the particular section. Based on a significance score of each related section to the particular section, the one or more related sections are ranked. An ordered set of navigational links to at least some of the one or more related sections are presented to the user.

Yet another embodiment of the present invention is directed to graphical user interfaces for rich navigational study aids for electronic books. The graphical user interfaces for the navigational study aids may include a digital content interface; a related sections interface; and an information processing preference interface. A first display area may present a particular section of a digital content. A second display area may be configured to display an ordered set of navigational links to at least some of one or more related sections for the particular section. Each of the one or more related sections provides additional context to the particular section being presented on the first display area and are ranked based on a significance score. A third display area may present a control interface for receiving the information processing preference of the user. In some embodiments, the information processing preference is a decimal value, typically from 0 to 1. The value can indicate the reader preference between a curious-type reader to a diligent-type reader.

Having briefly described an overview of embodiments of the present invention, an exemplary operating environment in which embodiments of the present invention may be implemented is described below in order to provide a general context for various aspects of the present invention.

Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-usable instructions, including computer-usable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more buses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures (i.e., motion or movements associated with a user's hand or hands or other parts of the user's body), voice, or other physiological inputs generated by a user. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with one or more touch digitizers and/or depth cameras, such as, stereoscopic camera systems, infrared camera systems, RGB camera systems, and combinations of these for direct and/or hover gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Figure 2:
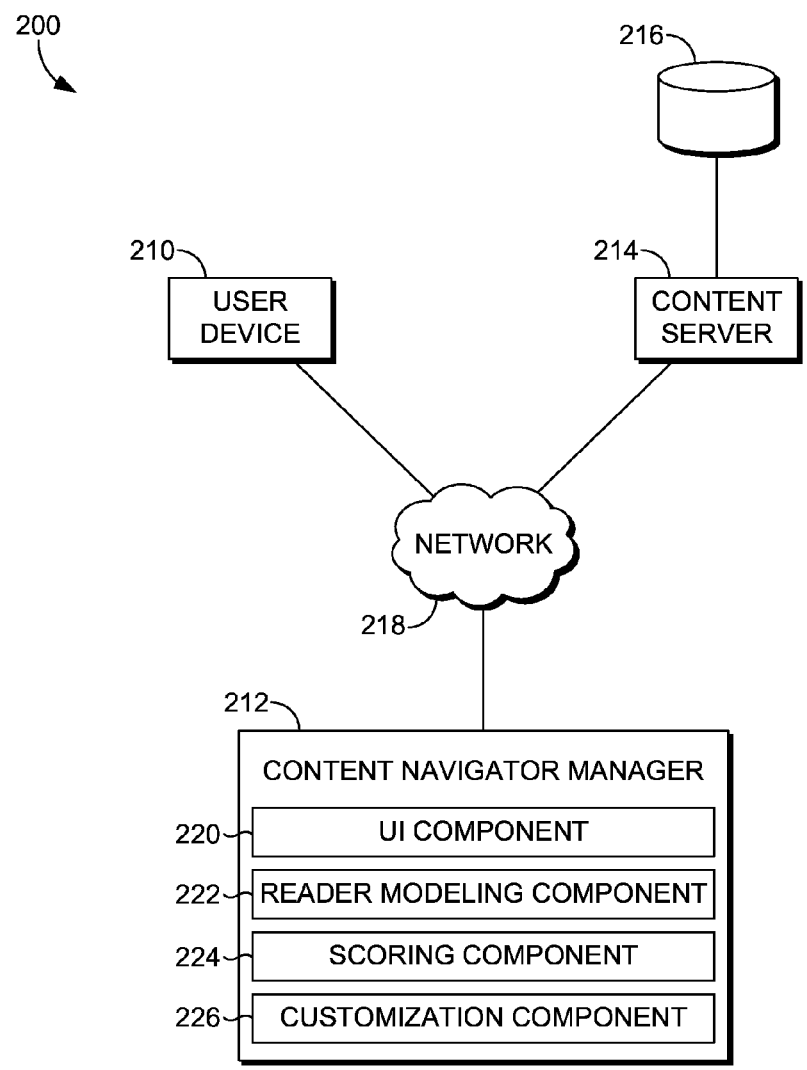
FIG. 2 schematically shows a system diagram suitable for performing embodiments of the present invention.

Turning now to FIG. 2, a block diagram of an exemplary network environment 200 suitable for use in implementing embodiments of the invention is shown. The network environment includes a user device 210, a content navigator manager 212, a content server 214, and a data store 216. The user device 210, the content navigator manager 212, the content server 214, and the data store 216 can communicate through the network 218, which may include any number of networks such as, for example, a local area network (LAN), a wide area network (WAN), the Internet, a cellular network, a peer-to-peer (P2P) network, a mobile network, or a combination of networks. The network environment 200 shown in FIG. 2 is an example of one suitable network environment and is not intended to suggest any limitation as to the scope of use or functionality of embodiments of the inventions disclosed throughout this document. Neither should the exemplary network environment be interpreted as having any dependency or requirement related to any single component or combination of components illustrated therein. For example, the user device 210 may be in communication with the content navigator manager 212 via a mobile network or the Internet, and the content navigator manager 212 may be in communication with the content server 214 and/or data store 216 via a local area network. Further, although the environment is illustrated with a network, one or more of the components may directly communicate with one another, for example, via HDMI (high-definition multimedia interface), DVI (digital visual interface), USB (Universal Serial Bus), etc. Alternatively, one or more components may be integrated or comprised within with one another, for example, at least a portion of the content navigator manager 212 may be integrated with the user device 210.

The user device 210 can be any kind of computing device capable of storing, presenting, or navigating documents. In embodiments, documents may be presented on the user device via a content-navigator interface. In this regard, the user device 210 might allow a user to submit a request, for example, to the content server 214 and to receive, in response to the request, one or more documents. For example, in an embodiment, the user device 210 can be a computing device such as computing device 100, as described above with reference to FIG. 1. In embodiments, the user device 210 can be a personal computer (PC), a laptop computer, a workstation, a mobile computing device, a PDA, a cell phone, a tablet, or the like.

In an embodiment, the user device 210 is separate and distinct from the content navigator manager 212, the content server 214 and/or the data store 216 illustrated in FIG. 2. In another embodiment, the user device 210 is integrated with one or more illustrated components. For clarity of explanation, we will describe embodiments in which the user device 210, the content navigator manager 212, the content server 214, and the data store 216 are separate, while understanding that this may not be the case in various configurations contemplated within the present invention.

The data store 216 of FIG. 2 is configured to store various types of information used by the user device 210, the content navigator manager 212, and/or the content server 214. In embodiments, the content server 214 provides documents to the data store 216 for storage, which may be retrieved or referenced by the user device 210 and/or content navigator manager 212. Additional or alternative types of information stored in data store 216 may include, for example, navigational structures for documents, user navigational patterns of documents, user data (e.g., information processing preference), user device 210 data, concept phrases for documents, etc. In embodiments, at least a portion of the navigational structures calculated may be stored in a content navigation log such that the log may be accessed to identify previously generated navigational structures. Information stored in data store 216 may be used to determine navigational structures. For example, the content navigator manager 212 may determine navigational structures based on information stored in data store 216, including, for example, content navigation logs, user data, concept phrases, sectional or phrasal relationships, etc., as described more fully below.

With continued reference to FIG. 2, the user device 210 communicates with the content navigator manager 212 for providing a user with a rich navigational structure of a document. In embodiments, for example, a user utilizes the user device 210 to retrieve documents via the network 218. For instance, in some embodiments, the network 218 might be the Internet, and the user device 210 interacts with the content server 214 to retrieve a desired document from the data store 216. The user device 210 may then request navigational aid for the retrieved document from the content navigator manager 212. In other embodiments, for example, the content navigator manager 212 might be integrated with the user device 210, such that retrieval and navigational processing of the document is performed at least partially on the user device 210. In even further embodiments, for example, the content navigator manager 212 may be integrated with the content server 214, such that navigational processing of the document is performed prior to retrieval of the document by the user device 210. The document, having been processed by the content navigator manager 212, can comprise metadata including the navigational structure data, or be presented as a web page having all navigational structure and links embedded therein. It should be apparent to those having skill in the relevant arts that any number of other implementation scenarios may be possible as well.

The content navigator manager 212 provides navigational structures for documents. In embodiments, the content navigator manager 212 provides navigational structures by processing documents in environments in which content can be stored such as, for example, the Internet, a local area network (LAN), a wide area network (WAN), a database, a computer, or the like. The content navigator manager 212, according to embodiments, can be implemented as server systems, program modules, applications, virtual machines, components of a server or servers, networks, and the like.

In embodiments, the content navigator manager 212 receives documents submitted by the user via the user device 210 and/or processes the documents upon receipt by the user device 210. The content navigator manager 212 can also preprocess documents on the content server 214 for subsequent retrieval by the user device 210 for desired viewing. In some embodiments, the content navigator manager 212 can function as a cloud-based service for processing documents on-the-fly. The content navigator manager 212 processes documents and generates navigational structures for the documents. In embodiments, the content navigator manager 212 includes a user interface ("UI") component 220, a reader modeling component 222, a scoring component 224, and a customization component 226. According to embodiments of the invention, the content navigator manager 212 can include any number of other components not illustrated. In some embodiments, one or more of the illustrated components 220, 222, 224, and 226 can be integrated into a single component or can be divided into a number of different components. Components 220, 222, 224, and 226 can be implemented on any number of machines and can be integrated, as desired, with any number of other functionalities or services.

The UI component 220 is generally configured to present a graphical user interface to the navigational structure of a document. The UI component 220 can be a graphical user interface of a standalone application or a web page presenting a web-based graphical user interface. In other embodiments, the UI component 220 can be software embedded in the user device 210, particularly in configurations where the content navigator manager 212 is part of the user device 210. As will be discussed, the navigational structure of the document will be generated for reader navigation, once processed by components of the content navigator manager 212. In some embodiments, the UI component 220 will at least present a section of the document currently being viewed by the user. The UI component 220 can also present, based on the section being viewed, a navigator panel presenting a list of hyperlinks to other relevant sections in the document for understanding and/or providing additional context to the current section. In other embodiments, a table of contents can be presented for navigating the document. For example, a document may come preconfigured with sections divided by chapters, topics, subtopics, categories, etc. The table of contents can be configured to display the preconfigured sections or can be generated by the content navigator manager 212. As will be described further with brief reference to FIG. 7, the UI component 220 is configured to present the user with a graphical user interface on a display screen of a user device, and to receive user inputs based on input controls presented by the UI component 220.

The reader modeling component 222 is generally configured to define the data structure of the document that is used for ultimately determining relationships between related sections and calculating significance scores for each section. In some embodiments, a request to generate a reader model for a document may be received or recognized in any manner. In some embodiments, an indication to generate a reader model for a document may be recognized in accordance with issuance or submission of a document. In this regard, when a document is received, a reader model for the document is generated. In embodiments, the concept phrases comprised within the document are provided therewith. In other embodiments, the concept phrases can be algorithmically mined from each section using one of a detecting of structural properties of a phrase, or a computing of phrase importance based on statistical properties thereof. In some instances, if the document includes an index or table of contents, phrases extracted therefrom can be used directly or for influencing the determination of the concept phrases.

Figure 3:
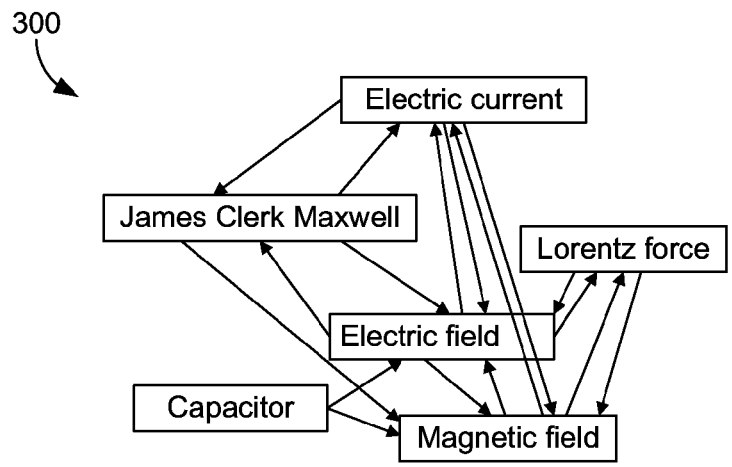
FIG. 3 is an exemplary relational diagram that illustrates relationships between a plurality of example concept phrases, according to embodiments of the present invention.

Referring now to FIG. 3, an exemplary relational diagram between concept phrases pertaining to "electricity" is illustrated. The figure is merely provided to portray the data representation of relationships between concept phrases in one particular example, which may be included with the document or calculated upon receipt thereof, and is not intended to limit how relationships between concept phrases are described or determined. One of ordinary skill in the art can appreciate that the exemplary relationships between the illustrated concepts of "electricity" can similarly be applied to other subjects. One of ordinary skill can also appreciate that, because concepts related to principles are intertwined and dispersed within various portions of a text, a document comprising such concepts are divided into sections or chapters to best organize the data for the reader.

Figure 4:
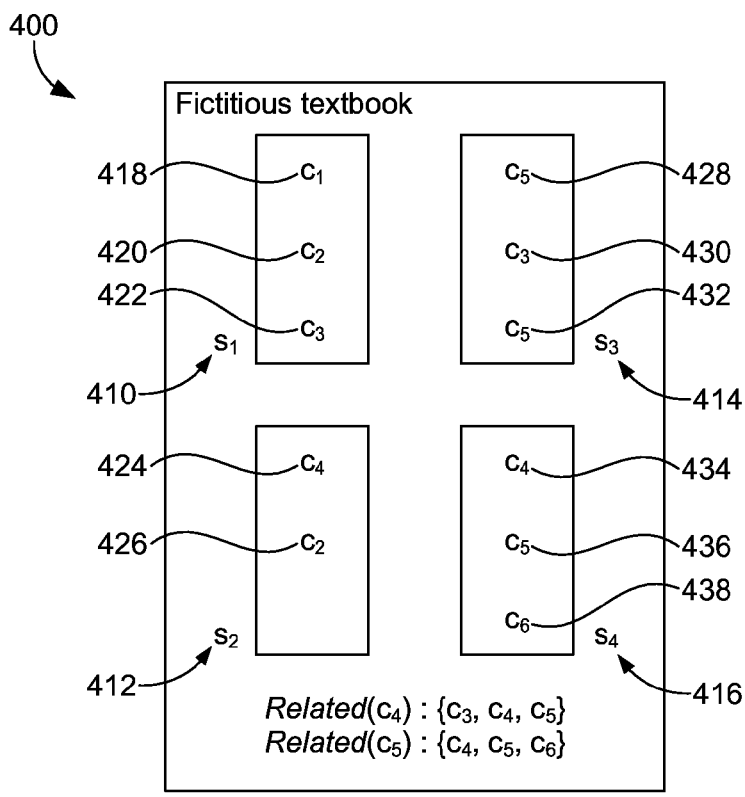
FIG. 4 is a block diagram that illustrates components of a document, according to embodiments of the present invention.

Referring now to FIG. 4, a representation of the document 400 is illustrated. The document 400 may include, for example, four sequential sections $S_1$ 410, $S_2$ 412, $S_3$ 414, and $S_4$ 416, with each section comprising a unique composition of concept phrases (i.e., terminological noun phrases) $C_1$-$C_6$ 418-438. By way of example only, we assume that the illustrated concept phrase $C_4$ 424,434 is directly related to $C_3$ 422,430, $C_4$ 424, 434, and $C_5$ 428,432,436. As can be understood by one of ordinary skill in the art, each unique concept phrase can be equated to a unique concept related to a principle, as previously described in FIG. 3.

By way of background, a reader reading a book may start from a first section. When reading section I, for example, the reader may come across a set of concept phrases in the order of $C_1$, $C_2$, and $C_3$. When the reader encounters a concept phrase C, with a large probability, the reader will be persistent in continuing to read the section. However, with a certain probability, the reader may not understand the concept phrase and may be forced to refer to another section to seek explanation. Postulate that whenever the reader does not understand C, the reader refers to a section containing the same concept phrase C or a different concept phrase related to C. More precisely, the reader picks a concept phrase C' from the set of concept phrases related to C with equal probability, chooses an occurrence of C' amongst all occurrences of C' in the book with equal probability, and refers to the corresponding section I' to learn more about C'. It is possible that I' is a section earlier in the book or it is a later section. After reading about C' in I', the reader has the following options: (1) return to the original section I with a large probability, and continue further reading, or (2) digress further to learn more about C' by referring to a section containing C' or a different concept phrase related to C', that is, pick a concept phrase C" from the set of concept phrases related to C' with equal probability and refer to a section I" that contains C" amongst all occurrences of C" with equal probability. In the latter case, the reader then returns to the original section I, or digresses further. While digressing, the reader can revisit a section I' (e.g., for reading about C'" which is also explained in section I' and which is related to C"). However, the return from a digression is always to the starting section I (irrespective of the number of hops digressed) as the reader is trying to understand section I and the purpose of the digression is to seek better explanation for C occurring in I.

Figure 5:
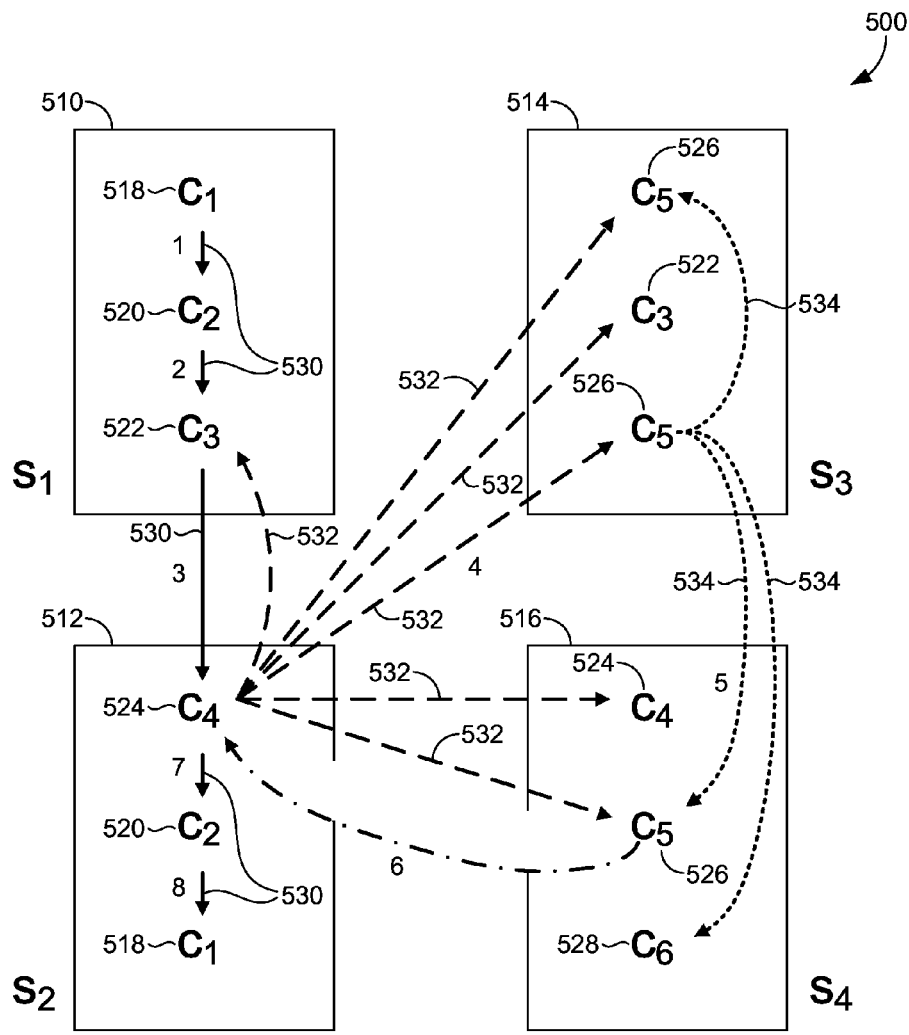
FIG. 5 is a block diagram of an exemplary document that illustrates the flow of traversal paths for purposes of understanding reader modeling, according to embodiments of the present invention.

Turning now to FIG. 5, an exemplary reader model 500 is illustrated for purposes of understanding exemplary reader traversal paths through a document. In the illustration, a hypothetical book 500 consisting of four sections ($S_1$, $S_2$ 510, $S_3$ 512, $S_4$ 516) and six concept phrases ($C_1$ 518, $C_2$ 520, $C_3$ 522, $C_4$ 524, $C_5$ 526, $C_6$ 528) is provided. The hypothetical reader in this example reads the book starting from $S_1$ 510. The paths (hereinafter also referred to as "digression lines" or "directed edges") followed by the reader through $S_1$ are indicated by numbers next to the arrows 530. Suppose the reader, after reading $S_1$ 510, does not understand concept phrase $C_4$ 524 in section $S_2$ 512, and hence is forced to refer to another section containing $C_4$ 524 or a concept phrase related to $C_4$ 524. Assume {$C_3$ 522, $C_4$ 524, $C_5$ 526} are a set of concept phrases related to $C_4$ 524, such that the available digressions correspond to the digression lines 532 as illustrated. The reader chooses a concept phrase from this set 522, 524, 526. Suppose the reader chooses $C_5$ 526. Out of the three occurrences of $C_5$ 526 in the book, suppose the reader selected the second occurrence of $C_5$ 526 in $S_3$ 514. Thus, the reader follows the digression line 532 marked "4", to read about $C_5$ 526 in $S_3$ 514. After reading about $C_5$ 526 in $S_3$ 514, the reader either returns (no line shown) to $C_4$ 524 in $S_2$ 512 with a large probability or digresses further. Suppose the reader digresses further. Assuming {$C_5$ 526, $C_6$ 528} are the set of concept phrases related to $C_5$ 526, so that the available digressions correspond to digression lines 534 as illustrated. The reader selects $C_5$ 526 from this set and follows the digression line marked "5" to read about $C_5$ 526 in $S_4$ 516. Afterwards, the reader returns to $C_4$ 524 in $S_2$ 512 along the digression line marked 6, and persists to read further.

For purposes of understanding a formulation of the reader model, the following table of notations is provided:
S: Set of sections in the book or document (|S|=n)
C: Set of concept phrases in the book or document
R(c): Set of concept phrases related to concept phrase c
$\lambda_s(c,t)$: Significance score of concept phrase c occurring in a different section t for understanding section s
$k_s$: Number of desired concept references to be provided in the study navigator for a given section s In embodiments, the reader model is formulated as a random walk over a concept graph $G=(V, E_p \cup E_d)$. Each node $u=(i, c_{ij}, j) \in V$ is a (section, concept phrase, position) triplet corresponding to the occurrence of concept phrase $c_{ij}$ in section i and its sequential position j amongst the concept phrases in the section. Denote the associated section i by $\bar{i}(u)$ and the associated concept phrase $c_{ij}$ by $\bar{c}(u)$. There are two types of directed edges in G. The set of persistence edges $E_p$ comprises directed edges corresponding to sequential reading of the document, that is, there is a directed edge from (i, $c_{ij}$, j) to (i, $c_{i(j+1)}$, j+1) and from the last concept note in a section to the first concept node in the next section. The set of digression edges $E_d$ consists of directed edges corresponding to forced digression, that is, there is an edge from u to v if $\bar{c}(v) \in R(\bar{c}(u))$ (if the concept phrase associated with v is related to the concept phrase associated with u).

The random walk is comprised of at least three types of transitions: (1) a persistence transition; (2) a digression transition; and (3) a return transition. As described and illustrated herein, the persistence transition is defined, from any node u, as following the persistence edge, that is, the reader persists to read sequentially from the concept phrase occurrence corresponding to u. As such, and as will be further described herein, the probability associated with such a transition has the persistence factor γ. Further described and illustrated herein, the digression transition is defined, from any node u, as following the digression edge. As such, and as will be further described herein, the probability associated with a transition along one of the digression edges outgoing from a node has the digression factor β. Accordingly, if the reader picks a related concept phrase $c' \in R(\bar{c}(u))$, the reader selects an occurrence of c' amongst all occurrences with equal probability. As used herein, the return transition is defined from any node to which the reader has digressed, the reader returns to the node from which the digression originated. As such, this transition corresponds to the reader returning back to the starting point after a digression. Accordingly, as will be further described herein, the probability associated with such a return transition has the diligence factor α. The aforementioned walk requires a tracking of the sequential position of the reader in the document because whenever the reader digresses, the reader needs to return to the position from where the digression originated. On that end, the return transition depends not only on the current state in the walk, but also the state from which the reader started the digression. The Markov property can be achieved by creating—V—copies of the nodes (and digression edges) as follows. The modified graph consists of the set V of nodes, the set $E_p$ of persistence edges corresponding to sequential reading, and further, a copy of (V, $E_d$) rooted at each node $u \in V$. The digressions that originate from any node u are confined to the copy of V rooted at u and the return transitions point to u from all nodes in the copy rooted at u. By creating a separate copy of digression edges for each sequential position (node), the state from which the reader started the digression is tracked, and thus the return transition can be determined based on just the current state.

With brief reference back to FIG. 2, the scoring component 224 is generally configured to calculate a significance score of a concept phrase c in a related section t for understanding a particular section s by computing how often readers or students refer to the description of this concept phrase in the related section t when reading the particular section s. To that end, whenever a reader has difficulty understanding a concept phrase in a particular section s and hence is forced to digress to other sections, the likelihood of the reader to refer to concept phrase c in related section t is calculated. All likelihoods over many readers and over all concept phrases in the particular section s are aggregated.

Figure 6:
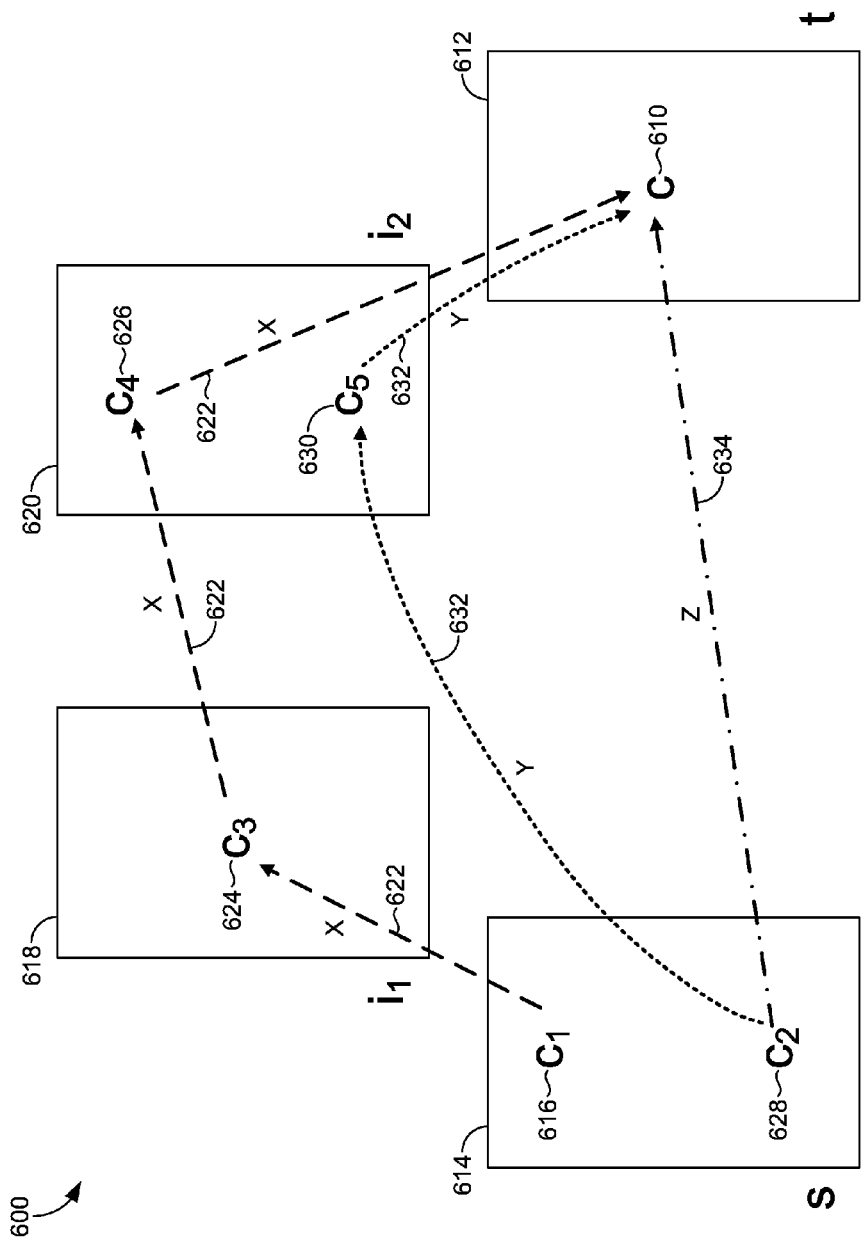
FIG. 6 is a block diagram of another exemplary document that illustrates the flow of traversal paths for purposes of understanding the calculation of significance scores, according to embodiments of the present invention.

Turning back now to FIG. 6, an exemplary reader model 600 is shown for illustrating how the scoring component 224 calculates a significance score of concept phrase c 610 in section t 612 for understanding section s 614. Consider three different readers trying to understand concept phrases in section s 614. Reader X is unable to understand concept phrase $c_1$ 616, and hence digresses to other sections 618, 620, 612, as illustrated by lines labeled x 622. The reader may first refer to $c_3$ 624 in section $i_1$ 618, followed by $c_4$ 626 in section $i_2$ 620, and finally c 610 in section t 612. Readers Y and Z are unable to understand concept phrase $c_2$ 628, but digress to different sections 620, 612. Reader Y refers to $c_5$ 630 in section $i_2$ 620, followed by c 610 in section t 612, as illustrated by lines labeled y 632, while reader Z directly digresses to c 610 in section t 612, as illustrated by lines labeled z 634. The significance score is calculated by the scoring component 224 by computing the likelihood of each such digression for different readers that reach c 610 in section t 612 starting from section s 614, and aggregating over many such digressions.

To that end, consider an exemplary random digression walk starting from an arbitrary node u (that is, the walk corresponding to the chain of digressions originating from u consisting of only digression and return transitions but no persistence transitions). In such a walk, the return transitions always point to u and the digression transitions are determined based on the current state. Hence, this walk induces a Markov chain over the strongly connected component reachable from node u. This Markov chain is (a) finite (b) irreducible since the underlying directed graph for the Markov chain consists of a single strongly connected component (any two arbitrary nodes v1 and v2 in this graph are reachable from each other since there are edges from v1 and v2 to u and paths from u to v1 and v2), and (c) aperiodic since self-loops are present at every node in the underlying directed graph for the Markov chain (recall that R(c) includes c, and hence there exists a digression edge from a node to itself). Thus, the Markov chain satisfies the necessary conditions for applying the fundamental theorem of Markov chains (25), leading to the claim that: there is a unique stationary probability distribution $\pi(u, .)$ associated with the random digression walk starting from any node u in G.

By definition, the stationary probability $\pi(u, v)$ denotes the probability that the walk starting from node u is at node v in the steady state. In other words, this probability corresponds to the relative frequency with which the reader refers the concept phrase $\bar{c}(v)$ corresponding to v when trying to understand the concept phrase corresponding to u and hence larger $\pi(u, v)$ implies that the reader is more likely to refer to v. Thus $\pi(u, v)$ is a measure of the relative significance of an occurrence of concept phrase $\bar{c}(v)$ in section $\bar{i}(v)$ corresponding to v for understanding the concept phrase corresponding to u. Considering the random walks starting from each concept node in a given section s of the document, we can thus compute the significance of a single occurrence of concept phrase $\bar{c}(v)$ in section $\bar{i}(v)$ for understanding concept phrase in section s. The goal of the scoring component 224 is to compute the significance of all occurrences of a concept phrase in a section. Hence we further aggregate the above score over all occurrences of concept phrase $\bar{c}(v)$ in section $\bar{i}(v)$. In this manner, we also incorporate the frequency of the concept phrase in the section. Note that persistence transitions are not included for significance score computation since sequential reading is the default reading behavior, and it is desirable to take into account the reader's deviation from this behavior in the form of forced digressions.

As such, the significance score $\lambda_s(c, t)$ of a concept phrase c in section t for understanding section s is defined in terms of the combined stationary probability associated with nodes corresponding to all occurrences of c in t, summed over random walks starting from all concept nodes in section s. The definition of $\lambda_s(c, t)$ takes into account the following desired factors: the frequency of c in t, the number of concept phrases related to c and the likelihood that the description of c in t would be referred for understanding concept phrases in section s in the document.

Given the stationary probabilities $\pi(., .)$ associated with the random digression walks, the significance score of a concept phrase c in section t for understanding section s is defined as: $\lambda s(c,t) = \Sigma_{v \in V: \bar{i}(v)=t; \bar{c}(v)=c} \Sigma_{u \in V: \bar{i}(u)=s} \pi(u,v)$ In the above definition, the inner summation is over all occurrences of concept phrases in section s (corresponding to the digressions by readers who are unable to understand different concept phrases in section s) and the outer summation is over all occurrences of concept phrase c in section t (corresponding to how often these readers refer to the description of c in section t).

As described above, the reader model comprises at least three relevant types of transitions between related concept phrases: persistence ($\alpha$); digression ($\beta$); and return ($\gamma$), with the persistence and return transitions being the dominant transitions in a theoretical reader model. When digression originates from a node, there are exactly two choices, to persist reading or to digress, and hence $\alpha+\beta=1$. Similarly, for subsequent nodes in the digression, there are exactly two choices, to return back to starting node or to digress further, and hence $\gamma+\beta=1$. Thus $\alpha=\gamma=1-\beta$. This relationship between $\alpha$ and $\gamma$ is in agreement with the following natural intuition: one's tendency to read forward in a section is the same as the tendency to return to the starting point after a digression, since both these tendencies try to achieve the same goal of one's disciplined reading and completion of the entire book. As such, a higher digression factor implies that the reader is more likely to digress to other sections when reading a section and hence would assign greater significance score to each ⟨concept phrase, section⟩ pair for understanding other sections. On the other hand, a lower digression factor implies that the reader is less likely to digress. In embodiments, the values of the significance scores of individual ⟨concept phrase, section⟩ pairs increase linearly with the digression factor. For example, if the digression factor $\beta=0.3$, such a setting would correspond to the reader starting a digression 30% of the time and persisting to read sequentially 70% of the time.

Referring briefly back to FIG. 2, customization component 226 is generally configured to provide user control for customizing various operations performed in the content navigator manager 212. The customization component 226 can be configured to receive input data generated by the UI component 220 and determine how the navigational structure of the document can be customized according to user preferences. In an embodiment, the user can be presented, via the UI component 220, with an input field for determining a number of concept references to be presented for a section of document. For example, the field can receive an input configured to determine a small fixed number of concept references across all sections of the document. In another embodiment, the number of concept references can be determined based on the distribution of the significance scores for each section. For example, given a limit $k_{max}$ (say, 5) on the maximum number of references to be shown and a desired coverage κ (say, 75%), $k_s$ can be set to be the minimum of (i) $k_{max}$ and (ii) the number of top (concept phrase, section) pairs for section s needed to cover κ fraction of the sum of significance scores over all (concept phrase, section) pairs for this section. As such, input fields for $k_{max}$ and a desired coverage κ can be presented, via the UI component 220, with fields corresponding to each input value for customization. The content navigator manager 212 may include, for example, a user interface component 220 for navigating the document. The user interface component, in some embodiments, is configured to present a graphical user interface for navigating the document by interpreting the navigational structure resulting from the content navigator manager 212 having processed the document and generating a navigational structure therefor.

In another embodiment, probabilities of the three transitions determined by the reader modeling component 222 and/or the scoring component 224 can be affected by customizing digression factor β. As described above, values of the significance scores of individual (concept phrase, section) pairs increase linearly with the digression factor. As such, in embodiments, the customization component 226 can be configured to receive an input value, via the UI component 220, indicative of a value between 0 to 1, corresponding to a level of preferred digressional (or sequential) reading available in the provided concept references.

In a further embodiment, the content navigator manager 212 can be customized to alter the scope of the references. That is, the content navigator manager 212 can provide a navigational structure that is generalized to include only section references, such that each section is treated as an atomic unit of reading. For this purpose, the significance score $\tilde{\lambda}_s(t)$ of section t for understanding section s is computed, and then the algorithm is modified to return an ordered list of top k section references for section s, based on the significance scores. $\tilde{\lambda}_s(t)$ can be computed either (1) by aggregating the significance scores at ⟨concept phrase, section⟩ granularity as: $\tilde{\lambda}_s(t) = \Sigma(\text{concept phrase c}) \text{ in section}$ $\lambda_s(c, t)$, or (2) modifying the reader model to treat each section as an atomic unit of reading. For example, the reader can be modeled to read an entire section before referring to other sections for concept phrases that the reader could not understand. In embodiments, whenever the reader digresses to a different section, the reader reads the digressed section from beginning to end, and then determines whether to digress to another section or return to the starting section.

Figure 7:
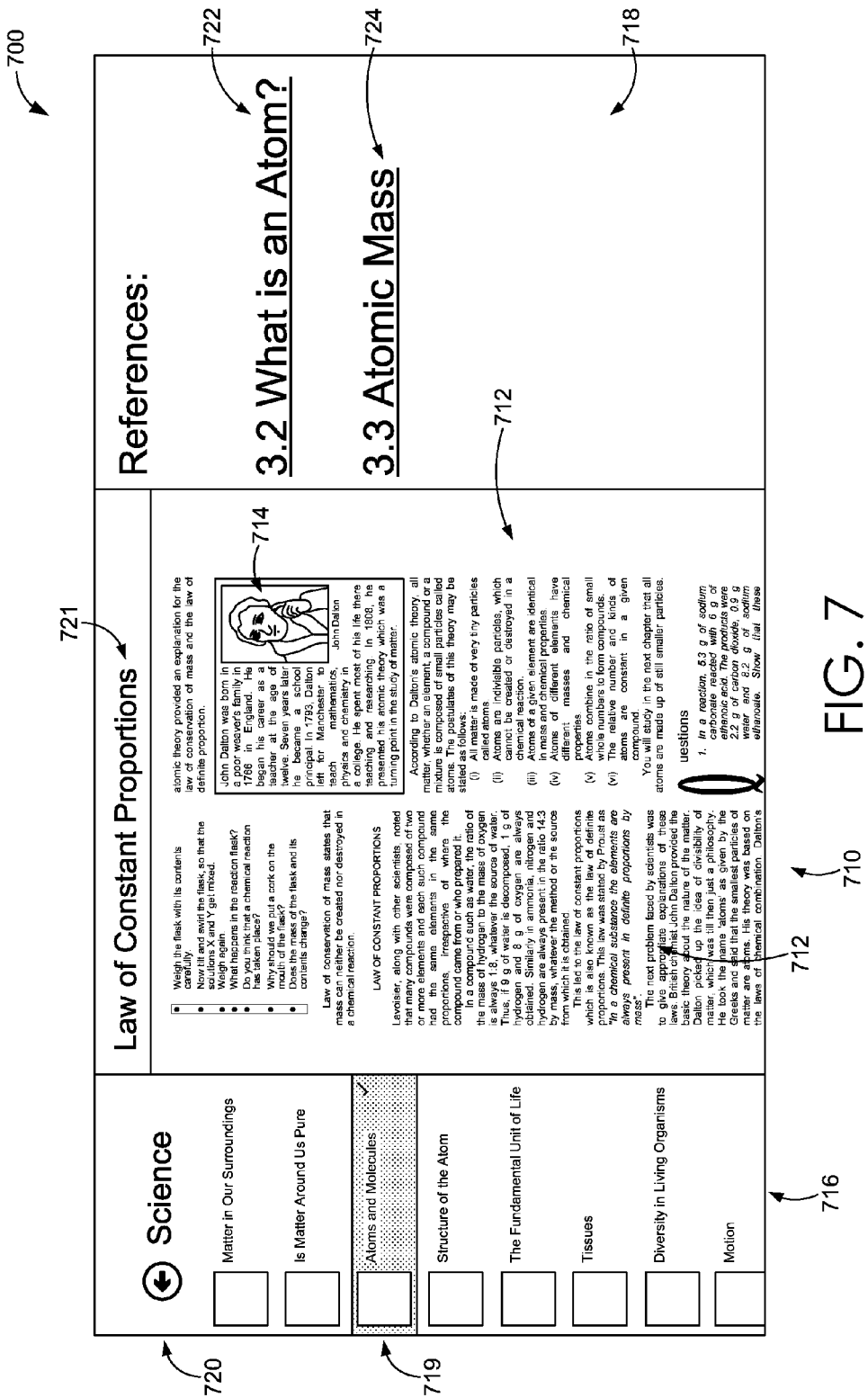
FIG. 7 is an exemplary graphical user interface of embodiments of the present invention.

By way of example only, FIG. 7 illustrates a display of a graphical user interface for presenting to a user a document with a generated rich navigational aid, according to embodiments of the present invention. Such display views can be viewed, for example, via a display screen of a user device, such as user device 210. As can be appreciated, a user may interact with a display screen using well known input components, such as, for example, a mouse, joystick, stylus, touch screen, keyboard, or the like.

As previously mentioned, FIG. 7 illustrates an exemplary user interface for a rich navigational aid 700 presented in response to an opening of a document 710. The document 710 can include pages comprising text 712, images 714, and other contextual information. The rich navigational aid 700 includes other navigational tools, such as a table of contents 716 and a study navigator panel 718.

As illustrated in FIG. 7, an example page of a chapter titled "Atoms and Molecules" 719 discussing the "Law of Constant Proportions" 721 is presented as the page 712 being viewed by the reader. In this regard, the page 712 includes all content 712, 714 typically included on a page of the document. In some embodiments, the page 712 can be configured to show a multi-page configuration, such that multiple pages of the document 710 are presented. The document 710, as illustrated, is titled "Science", as shown in the title portion 720 of the user interface 700. Assume, for purposes of the "Science" document, that the sections listed in the table of contents 716 are preconfigured as part of the document 710. As may be appreciated by one of ordinary skill in the art, electronic documents may include metadata for organizing known portions of the document (i.e., chapters, sections, etc.). As such, assume that the subsection "Law of Constant Proportions" 721 currently being presented, discusses laws of chemical combination—explaining Dalton's Atomic Theory, in particular, the law of definite proportions. As illustrated, the content navigator manager 212 has processed the currently presented section to generate the concept references 722, 724 provided in the study navigator panel 718. In the illustrated embodiment, the concept references are hyperlinks to relevant sections in the document for understanding the currently displayed section 712. Accordingly, while the section 712 being viewed can change as the reader progresses through the document 710, the study navigator panel 718 is continuously and automatically refreshed with one or more new concept references for the section being shown.

Although not illustrated, various configuration fields and/or controls can be provided in the user interface 700 to provide customization controls to the navigational aid, such as a controller for setting the reader's information processing preferences, or a number of desired concept references displayed. In this regard, the customization component 226 may be configured to receive from and/or send data to the user interface 700 to facilitate customization of the navigational aid.

Figure 8:
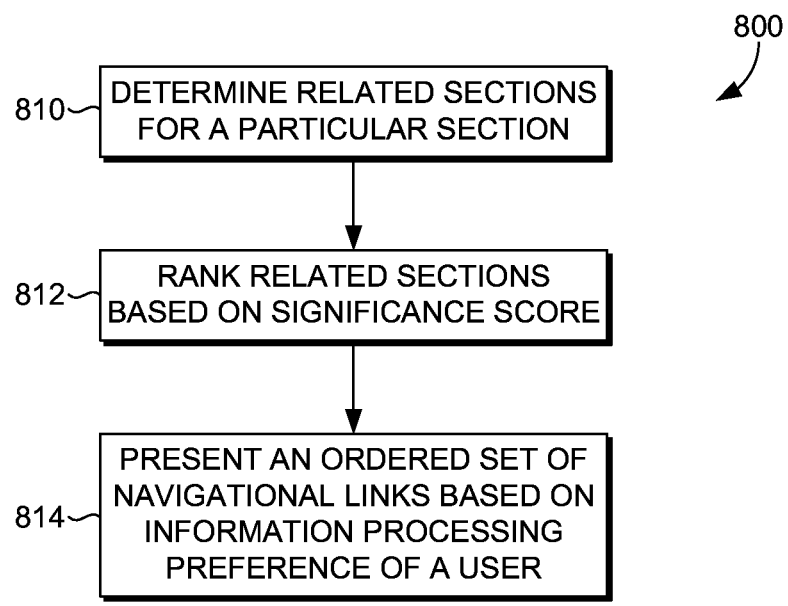
FIG. 8 is a flow diagram showing an exemplary method for generating a rich navigational study aid, according to embodiments of the present invention.

To recapitulate, embodiments of the invention include systems, methods, media, techniques, processes and options for generating a rich navigational aid for studying from electronic books or documents. The navigational aid is generated once the document is processed by a content navigator manager 212, which can be provided on a user device 210, provided as a network-based service 212, or as a module that preprocesses the documents on a content server 214. Turning now to FIG. 8, a flow diagram is illustrated that shows an exemplary method 800 for providing concept references to related sections of a document adapted to align with an information processing preference of a user. In some embodiments, aspects of embodiments of the illustrative method 800 can be stored on computer-readable media as computer-executable instructions, which are executed by a processor in a computing device, thereby causing the computing device to implement aspects of the method 800. The illustrative method can be performed, for example, by a user device, a searching service, a size-modifying service, or a combination thereof.

Initially, at block 810, one or more related sections for a particular section of a digital content are determined. Each related section providing additional context to the particular section. Such determination might be performed by a service, application, or computing device, such as the content navigator manager 212 of FIG. 2. At block 812, the one or more related sections are ranked based on a significance score for each related section. Significance scores can also be generated by the content navigator manager 212, more specifically, by the scoring component 224, reader modeling component 222, or a combination thereof. The significance scores a numerically ranked, typically in descending order, such that the highest scoring section is listed in the highest position. At block 814, an ordered set of navigational links to at least some of the one or more related sections (e.g., concept references) is presented. The one or more related sections are selected, based on an information processing preference of a user. The related sections may be determined by the content navigator manager 212, more specifically, by the reader modeling component 222. However, the related sections can also be customized based on an input provided by the user indicating a desired processing preference. Such a preference can be collected by the UI component 220, and sent to the customization component 226, for customizing the generated concept references to align with the user's processing preference.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more computer storage device storing computer-usable instructions that, when used by one or more processors of the computing devices, cause the one or more computing devices processors to perform operations comprising:

determining on the computing devices, for a particular section of a digital content provided for display by the computing devices, one or more related sections in the digital content, wherein each determined-related section provides additional context to the particular section, wherein the particular section and the one or more determined-related sections are each comprised of concept phrases that are indicative of a particular topic discussed therein;

ranking, utilizing the one or more processors of the computing devices, the one or more determined-related sections based on a significance score of each determined-related section to the particular section;

selecting, utilizing the one or more processors; at least some of the ranked determined-related sections located before and/or after the particular section based on a received information processing preference of a user; and presenting; by the computing devices, an ordered set of navigational links to each selected determined-related section in accordance with the information processing preference of the user.

2. The one or more computer storage device of claim 1, further comprising receiving an input indicative of the information processing preference of the user.

3. The one or more computer storage device of claim 1, wherein the concept phrases are algorithmically mined from each section using one of a detecting of structural properties of a phrase or a computing of phrase importance based on statistical properties thereof.

4. The one or more computer storage device of claim 1, wherein the determining of the one or more related sections for the particular section of the digital content is performed by at least correlating substantially similar concept phrases commonly comprised therein.

5. The one or more computer storage device of claim 4, wherein the significance score of each determined-related section is determined based on a sum of transition paths between the commonly comprised substantially similar concept phrases.

6. The one or more computer storage device of claim 5, wherein the transition paths are characterized as one of persistence reading, digression to related concept phrases, and return to initial reading.

7. The one or more computer storage media of claim 1, wherein the information processing preference is a scalar value from a first value to a second value, wherein the first value directs the determining step to select one or more determined-related sections located prior to the particular state, the second value directs the determining step to select one or more determined-related sections located after the particular section, and any scalar value between the first value and second value directs the determining step to select one or more determined-related sections located before and after the particular section in accordance with the scalar value.

8. A computer-implemented method comprising:

receiving an input indicative of an information processing preference of a user;

determining, for a particular section of a digital content, one or more sections in the digital content that are each related to the particular section, wherein each determined related section provides provides additional context to the particular section, and wherein the particular section and the one or more determined-related sections each comprise concept phrases that are indicative of a particular topic discussed therein;

ranking the one or more determined-related sections based on a significance score of each determined-related section to the particular section;

selecting at least some of the ranked determined-related sections located before and/or after the particular section based on the received input indicative the information processing preference of the user; and presenting, based on rank, an ordered set of navigational links to at least some of the one or more selected determined-related sections.

9. The computer-implemented method of claim 8, wherein the input indicative of the information processing preference of the user is a scalar value that corresponds to a user preference for determined-related sections located before and/or after the particular section of the digital content.

10. The computer-implemented method of claim 8, wherein a number of navigational links in the ordered set is determined based on one of a fixed number and a distribution of the significance score for each related section.

11. The computer-implemented method of claim 8, wherein the input indicative of the information processing preference of the user is received at any time during a viewing of the particular content for locating related sections thereto.

12. The computer-implemented method of claim 8, wherein the determining of the one or more sections that are each related to the particular section is accomplished by correlating substantially similar concept phrases commonly comprised there between.

13. The one or more computer storage media of claim 12, wherein the significance score of each determined-related section is determined based on a number of transition paths between the commonly comprised substantially similar concept phrases.

14. A graphical user interface embodied on one or more computer-readable storage device And executable on a computer having at least one processor, wherein when executed by the at least one processor, the graphical user interface comprising:
   a first display area for presenting a particular section of a digital content;
   a second display area for presenting a control interface that receives information processing preference of a user; and
   a third display area for displaying an ordered set of navigational links to at least some of one or more sections of the digital document determined, by the at least one processor, to be related to the presented particular section, wherein each of the one or more determined-related sections;

provides additional context to the presented particular section is ranked by the at least one processor based on a significance score, and is selected by the at least one processor for ordered display in the third display area based on the received information processing preference of the user.

15. The graphical user interface of claim 14, wherein the received information processing preference corresponds to a scalar value, and when the scalar value is a first value, one or more determined-related sections located only prior to the particular section is selected, when the scalar value is a second value, one or more determined-related sections located only after the particular section is selected, and when the scalar value is between the first value and the second value, determined-related sections located before and after the particular section are selected based on the scalar value.

16. The graphical user interface of claim 14, wherein the third display area is configured to update the ordered set of navigational links upon a changing of the particular section presented on the first display.

17. The graphical user interface of claim 14, wherein each section includes concept phrases that are indicative of a particular context discussed therein, and wherein the concept phrases are algorithmically mined from each section using one of a detecting of structural properties of a phrase or a computing of phrase importance based on statistical properties thereof.

18. The graphical user interface of claim 14, wherein the significance score of each determined-related section is determined based on a sum of transition paths between substantially similar concept phrases commonly included between the determined-related section and the particular section.

19. The graphical user interface of claim 18, wherein the transition paths are characterized as one of persistence reading, digression to related concept phrases, and return to initial reading.

* * * * *